United States Patent [19]

Pannwitz

[11] 4,239,301
[45] Dec. 16, 1980

[54] FLEXIBLE SPRING BEARING

[76] Inventor: Hans U. Pannwitz, P.O. Box 67, Odessa, Fla. 33556

[21] Appl. No.: 33,200

[22] Filed: Apr. 25, 1979

Related U.S. Application Data

[63] Continuation-in-part of Ser. No. 834,903, Sep. 20, 1977, Pat. No. 4,175,804.

[51] Int. Cl.³ ............................................. F16C 21/00
[52] U.S. Cl. ..................... 308/35; 308/163; 308/168
[58] Field of Search .................. 308/35, 163, 168, 26, 308/152, 184 R; 267/153, 63 R

[56] References Cited

U.S. PATENT DOCUMENTS

| | | | |
|---|---|---|---|
| 2,614,896 | 10/1952 | Pierce | 308/152 |
| 3,393,021 | 7/1968 | Guth | 308/26 |
| 3,412,990 | 11/1968 | Gladstone | 267/153 |

*Primary Examiner*—Lenard A. Footland
*Attorney, Agent, or Firm*—Stein & Frijouf

[57] ABSTRACT

A flexible spring bearing comprising a substantially cylindrical configuration with an arcuate portion being disposed circumferentially about the cylindrical configuration. The arcuate portions may be convexly curved outward or concavely curved inward. Although many combinations are possible, the preferred embodiment is a concave portion at one end and a convex portion at the other end. A thrust cap is incorporated to be inserted over the convex portion thereby evenly distributing the applied pressure throughout the flexible spring bearing and also regulating the flexibility of the convex portion. Furthermore, a main bearing race and thrust race are incorporated to be contiguous to the end of the concave portion. The main bearing race along with the cylindrical configuration rotates, via a bearing means, upon the thrust race. The bearing means may be an annular protrusion disposed concentric with the cylindrical configuration. The bearing means is protected from corrosion and dirt by various configurations of annular skirts and walls which form a channel with the bearing means located therein. The channel may be prepacked with a lubricant, thereby creating a hydraulic floating relationship between the main bearing race and thrust race. A visual indicator may be included to provide a means to measure the amount of surface wear of the bearing means on the thrust race.

23 Claims, 21 Drawing Figures

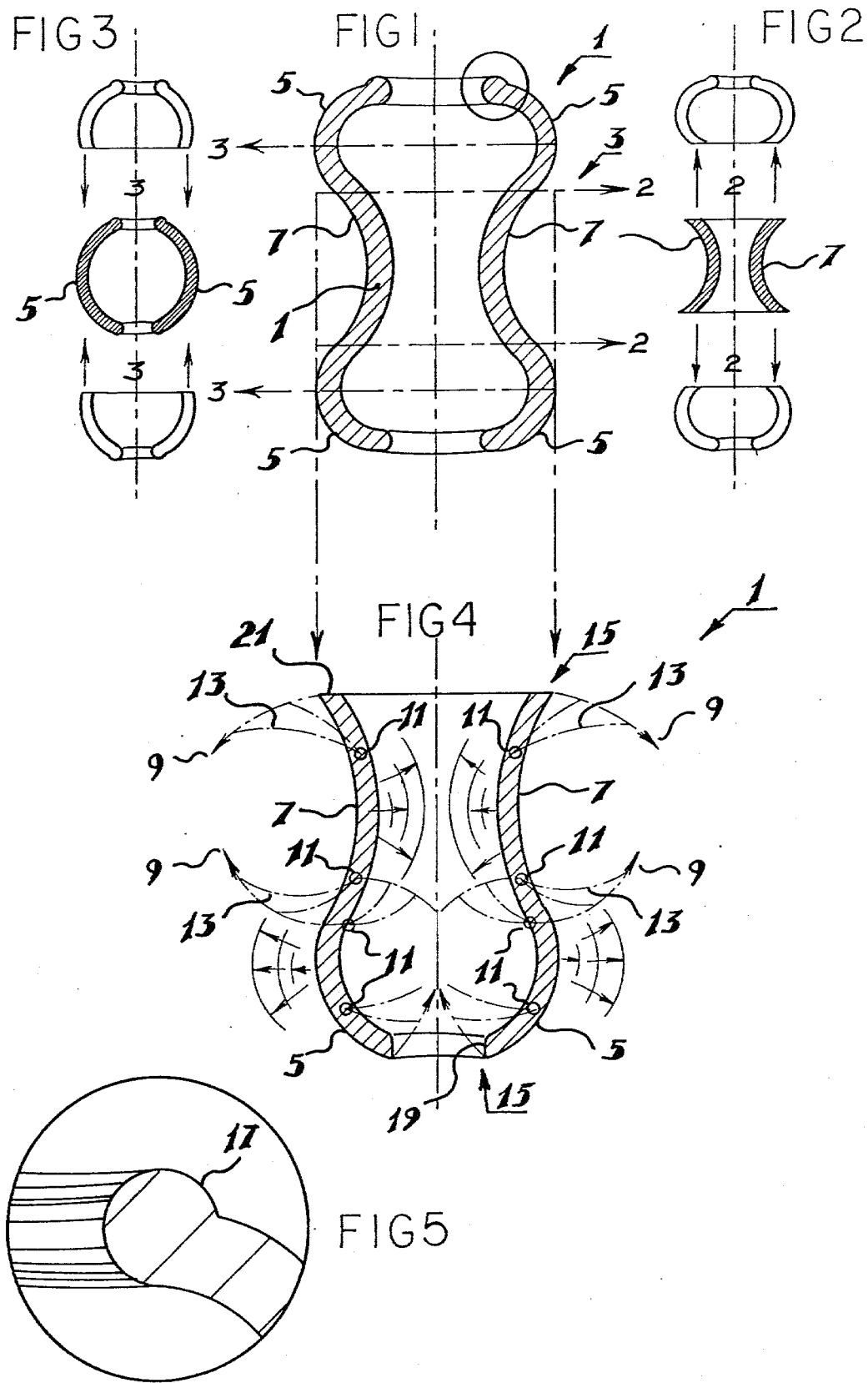

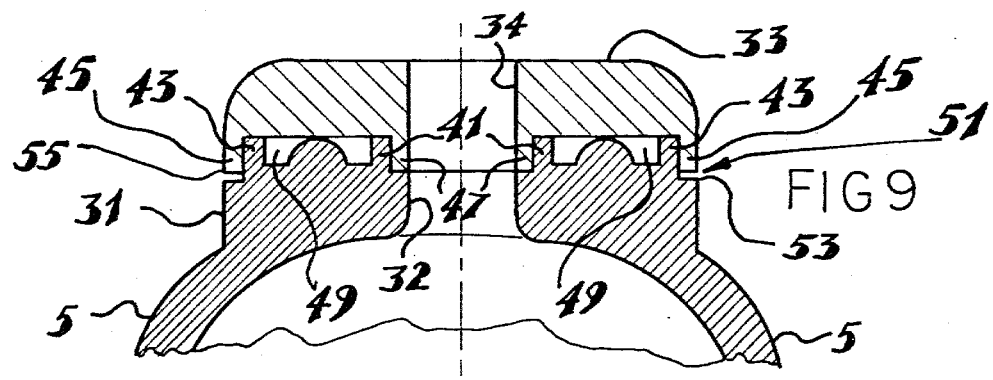
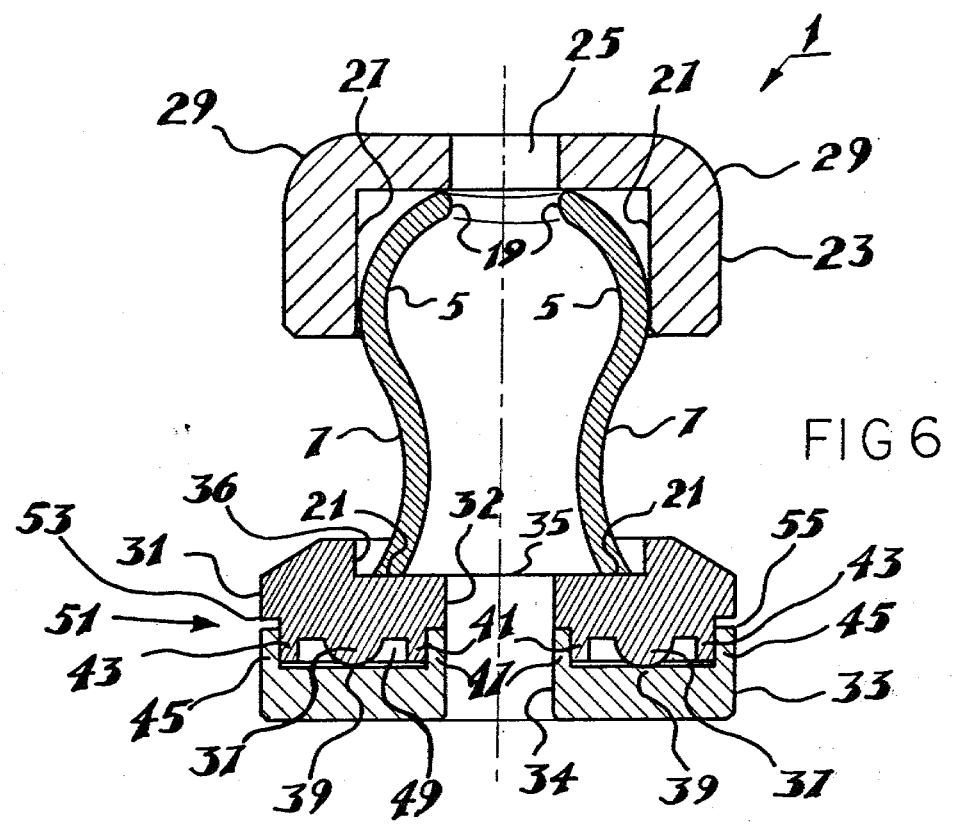
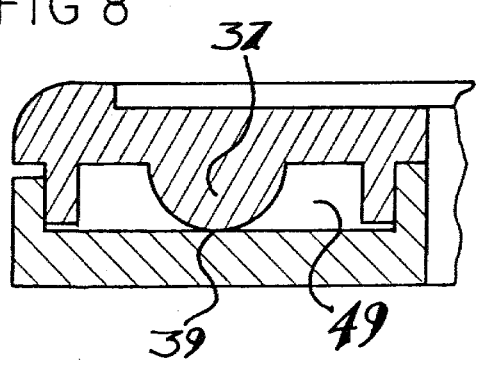
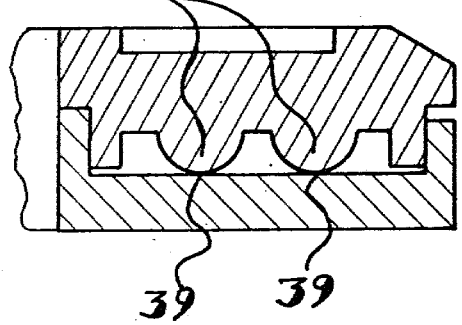

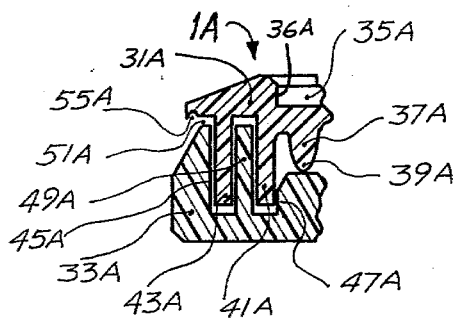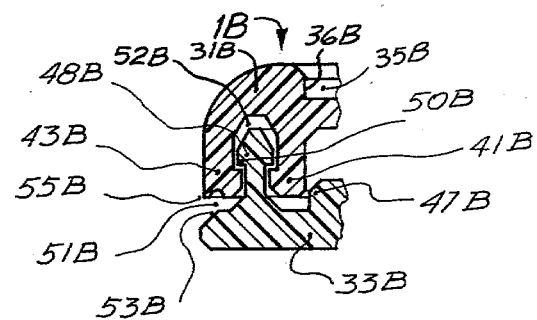
Fig. 10　　Fig. 11
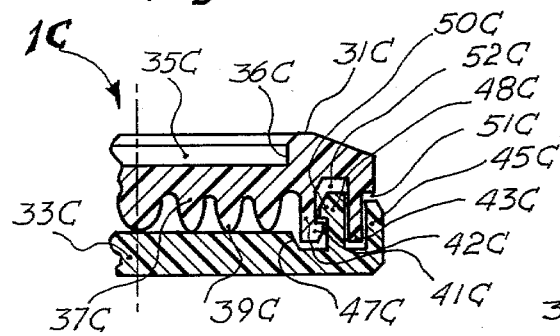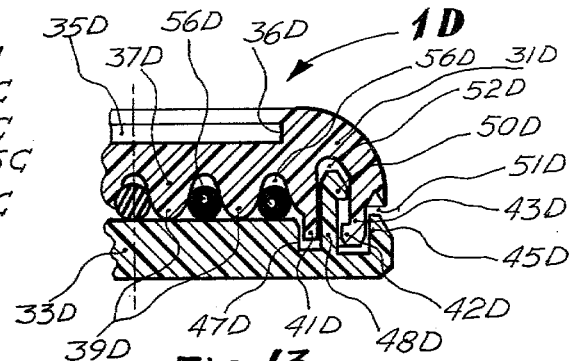
Fig. 12　　Fig. 13
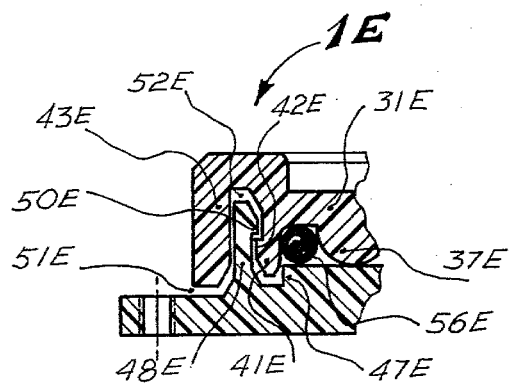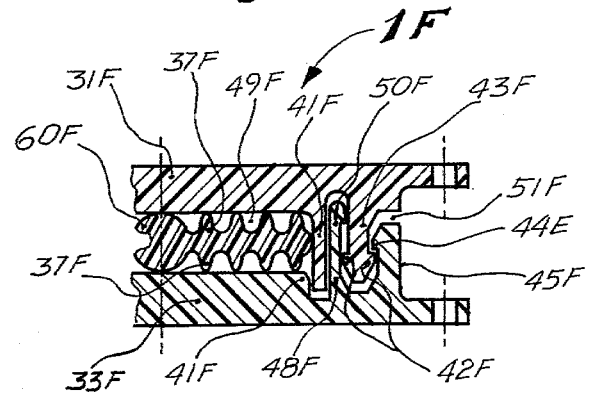
Fig. 14　　Fig. 15
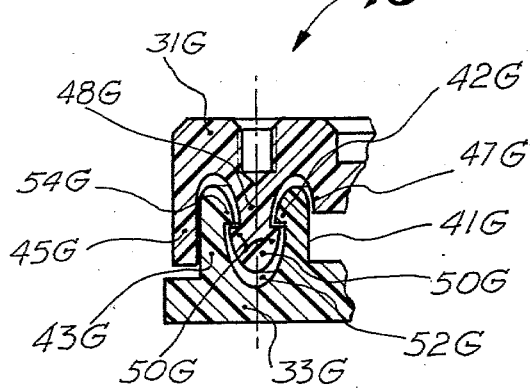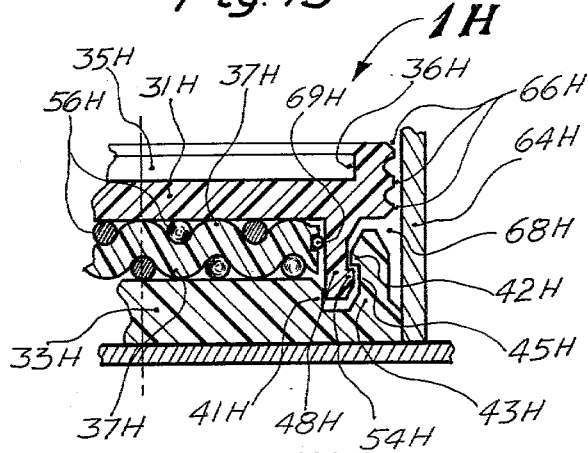
Fig. 16　　Fig. 17

FLEXIBLE SPRING BEARING

CROSS-REFERENCE TO RELATED APPLICATIONS

This is a continuation-in-part of my prior pending patent application, Ser. No. 834,903 filed Sept. 20, 1977 now U.S. Pat. No. 4,175,804 issued Nov. 27, 1979.

BACKGROUND OF THE INVENTION

1. Field of the Invention

This invention relates to flexible spring bearings such as thrust bearings, pressure-springs, shock absorbers or flexible self-aligners. The invention may be used in many mechanical devices such as turret mechanisms, carousels, davits, cranes and swivel-joints. The invention is particularly applicable in high corrosive environments requiring hermetically sealed, high load and low revolution thrust bearings.

2. Description of the Prior Art

Presently there exists many types of bearing. Generally, a bearing consists of a bushing or rollers or balls encased in a raceway for journalling a shaft. Another type of bearing presently available is flexible to provide a shock absorbing bearing structure.

U.S. Pat. Nos. 3,697,144 and 3,961,829 are typical flexible bearings which are primarily used as resilient supports or mountings. The bearings incorporate a rubber sleeve which renders the bearings flexible. Unfortunately, the rubber sleeve deteriorates when subjected to a dirty or otherwise hostile environment.

U.S. Pat. Nos. 3,033,622 and 3,941,433 are other flexible bearings. These bearings are primarily designed to be used as a shock absorber rather than a bearing per se. Hence they are undesirable in applications where rotational and shock absorbing bearings are required for operation.

In my prior patent application, Ser. No. 834,902, filed Sept. 20, 1977, I disclosed a novel flexible bearing having a main bearing race and a thrust race with bearing means having an inner and outer skirt for containing a bearing lubricant. My present invention improves upon my prior application to provide improved sealing for the bearing lubricant.

Therefore, in order to overcome the particular inherent inadequacies of the prior art, it is an object of this invention to provide a bearing which is substantially frictionless.

A further object of this invention is to provide a bearing which may be utilized as a shock absorbing bearing.

A further object of this invention is to provide a bearing that is hermetically sealed for use in a dirty or hostile environment.

A further object of this invention is to provide a bearing which will not deteriorate in a hostile environment.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with the specific embodiment shown in the attached drawings and explained in the detailed discussion. For the purpose of summarizing the invention, the invention may be incorporated into a flexible spring bearing comprising a generally cylindrical body having walls curved in a specific manner to render the body flexible. The walls may be convexly curved outward or concavely curved inward. A combination of such curvatures could also be utilized. For one example, a convex curvature is disposed circumferentially about both ends of the cylindrical body and a concave curvature is disposed therebetween. This particular combination of curvatures would shape the body into an hourglass configuration. This example is the most flexible for a given minimum height with a maximum longitudinal response. Other embodiments are possible by simply incorporating other combinations of the convex or concave curvatures. The flexibility of the spring bearing is thus determined by the combination of curvatures and the flexibility of the bearing material.

The flexible spring bearing further comprises a main bearing race and thrust race. The main bearing race may either be integrally formed with the cylindrical body or disposed as a separate unit. The cylindrical body and main bearing race rotate via the bearing means upon the thrust race.

The bearing means preferably is an annular protrusion which is integrally formed with either the main bearing race or the thrust race. This configuration is superior to a conventional ball or roller bearing since the protrusion is integrally incorporated into the spring bearing and cannot bind with the mating part.

The main bearing race is protected from dirt and corrosion by annular skirts and walls. The skirts and walls form a hermetically sealed channel with the bearing means located therein.

The channel may be prepacked with a lubricant. The lubricant reduces the coefficient of friction of the bearing means to decrease the friction within the bearing means. Furthermore the channel may be hydraulically pressurized to create a hydraulic floating relationship between the main bearing race and thrust race. Hence the bearing means actually "floats" on the thrust race, thereby minimizing friction and creating an inherent self-locking property.

A spring retaining cap may be incorporated into the spring bearing to cover the convex curvature disposed at the end of the cylindrical body. The spring retaining cap distributes the axial pressure throughout the cylindrical body in addition to regulating the flexibility of the convex curvature.

The invention may also be incorporated into an improved bearing comprising a substantially cylindrical configuration having an aperture therein. A main bearing race is disposed at an end portion of the cylindrical configuration. A thrust race is disposed adjacent the main bearing race with a bearing means interposed between the main bearing race and the thrust race enabling rotation therebetween. The bearing means comprises a plurality of protrusions established concentric with the cylindrical configuration with each of the plurality of protrusions being at least partially annular about the cylindrical configuration. A main bearing skirt extends annularly from the main bearing race and concentric with the cylindrical configuration. A thrust race skirt extends annularly from the thrust race for cooperation with the main bearing skirt for forming a rotatable seal therebetween.

In a more specific embodiment of the invention, the plurality of protrusions may integrally extend from either the main bearing race or the thrust race. In the alternative, the plurality of protrusions may extend from an intermediate member disposed between the main bearing race and the thrust race. In this embodiment, the plurality of protrusions extend from plural sides of the intermediate member. A plurality of ball bearings may be disposed between the plurality of protrusions for further reducing the friction.

In a further embodiment of the invention, the plurality of protrusions extend from the main bearing race which has a cross-sectional area in a general shape of a +. An important aspect of the invention comprises the cooperation between the main bearing skirt and the thrust bearing skirt. In one embodiment, one of the main bearing skirts and the thrust bearing skirt includes a plurality of skirts for receiving the other of the main or thrust bearing skirt therebetween. This interrelation may include an interlocking means established between the main bearing skirt and the thrust skirt to prevent separation thereof. The interlocking means may include a tap extending radially relative to one of the main bearing skirt means or the thrust skirt means. Preferably, the substantially cylindrical configuration comprises at least one arcuate portion extending circumferentially about at least one section of the cylindrical configuration.

In another embodiment of the invention, the improved bearing comprises a partially cylindrical configuration having an aperture for receiving a shaft therein. The configuration has an internal bearing cavity communicating with the aperture. A main bearing race is disposed in the internal bearing cavity of the configuration. A thrust race is disposed in the internal cavity adjacent the main bearing race. The bearing is disposed in the internal bearing cavity for journalling the shaft relative to the main bearing race and the thrust race. The bearing includes a plurality of projections extending radially relative to the shaft for facilitating rotation of the shaft relative to the partially cylindrical configuration. The bearing means may include a bearing aperture for receiving the shaft with a shaft lock for securing the shaft relative to the bearing. The shaft lock may be in the form of a key or similar configuration. The cylindrical configuration may include a first and a second member secured relative to one another. The main bearing race is integral with the first member and a thrust race may be integral with the second member. The bearing means may take various forms including the triangular cross-section or a cross-section in the general shape of a +. Flexible mounting means may flexibly mount the cylindrical configuration relative to a support which may include a plurality of ribs extending radially outward from the partially cylindrical configuration to flexibly support the shaft.

This invention accordingly comprises an apparatus possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a cross-sectional view of a first embodiment of a flexible spring bearing;

FIG. 2 is a cross-sectional view of a second embodiment of a flexible spring bearing;

FIG. 3 is a cross-sectional view of a third embodiment of a flexible spring bearing:

FIG. 4 is a cross-sectional view of a fourth embodiment of a flexible spring bearing;

FIG. 5 is an enlarged cross-sectional view of a semicircular configuration of the annular tip portion;

FIG. 6 is a cross-sectional view of the flexible spring bearing, main bearing race, thrust race and spring retaining cap;

FIG. 7 is a partial cross-sectional view of the annular protrusion integral to the main bearing race;

FIG. 8 is a partial cross-sectional view of the annular protrusion integral with the thrust race;

FIG. 9 is a cross-sectional view of the main bearing race integral with the cylindrical configuration:

FIG. 10 is a cross-sectional view of a fifth embodiment of my invention showing a hermetically sealed thrust bearing;

FIG. 11 shows a sixth embodiment of a hermetically sealed thrust bearing;

FIG. 12 illustrates a seventh embodiment of a hermetically sealed bearing;

FIG. 13 is still another embodiment of a hermetical seal between a main bearing race and a thrust bearing race;

FIG. 14 is a cross-sectional view of a thrust bearing race and a main bearing race with ball bearings incorporated therebetween;

FIG. 15 is a sectional view of another embodiment utilizing ball bearings between a main bearing race and a thrust bearing race;

FIG. 16 is a side sectional view of a main bearing race and a thrust race with an independent bearing means interposed therebetween;

FIG. 17 is a side sectional view of a main bearing race and a thrust race with separate bearing means interposed therebetween utilizing distinct ball bearings;

Similar reference characters refer to similar parts throughout the several views of the drawings.

DETAILED DESCRIPTION

Figure 18:
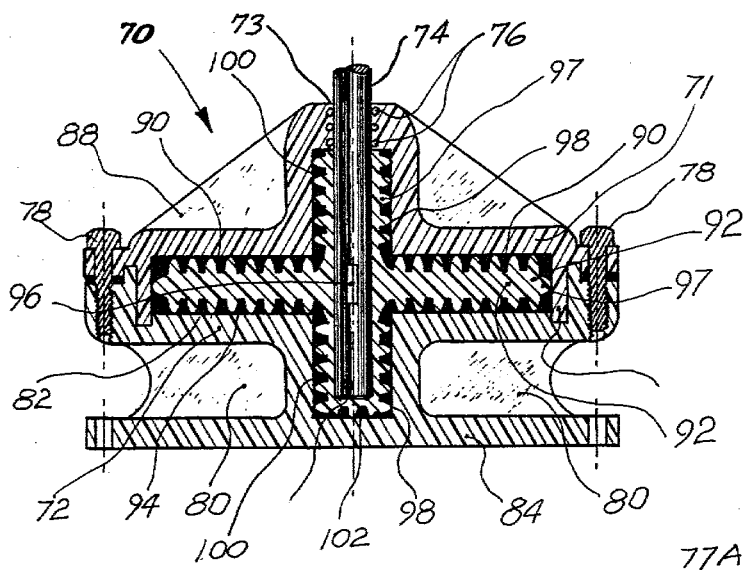
FIG. 18 is a side sectional view of still another embodiment of my invention utilizing an independent bearing means between a main bearing and thrust race.

FIG. 1 is a cross-sectional view of the first embodiment of the flexible spring bearing 1. The bearing comprises a substantially cylindrical configuration 3 with an annular convex bulge 5 disposed circumferentially about each end of the cylindrical configuration 3. An annular concave bulge 7 is similarly disposed circumferentially about the center of the cylindrical configuration 3. This first embodiment is the most flexible for a given minimum height with a maximum longitudinal response. Accordingly, a fundamental function of this embodiment is a pressure spring, shock absorber or a flexible self-aligner.

Other embodiments of the spring bearing 1 are developed by virtually slicing the first embodiment in a specific manner. FIG. 2 is a second embodiment of the spring bearing 1 obtained by slicing the first embodiment along lines 2—2. The second embodiment is a substantially cylindrical configuration 3 with an annular concave bulge 7 disposed circumferentially about the center. Similarly, FIG. 3 is a third embodiment of the spring bearing 1 obtained by severing the end portions along lines 3—3 and interconnecting the severed ends. The third embodiment is a substantially cylindrical configuration 3 with an annular convex bulge 5 disposed circumferentially about the center portion.

FIG. 4 is a cross-sectional view of the fourth embodiment of the spring bearing 1. This embodiment is a substantially cylindrical configuration 3 with an annular concave bulge 7 and an annular convex bulge 5 disposed circumferentially at opposite ends of the spring bearing 1. This embodiment is more particularly shown as an example to demonstrate the typical flexing characteristics of all of the embodiments. The direction of flex is indicated by the flex directional arrows 9 which originate from the focal points 11. The flex responses are made more visible through the superimposure of flex lines 13 along the paths of the flex directional arrows 9.

The frictionless characteristics of the spring bearing 1 are enhanced by the different configurations of the surface contact points. As best shown in enlarged FIG. 5, the bearing includes an annular lip portion 15 having a cross-sectional semi-circular configuration 17. During use, a mandrel or the like is inserted into the center of the cylindrical configuration 3 and is seated upon the lip portion 15. Therefore, upon movement, the mandrel rotates upon a cross-sectional apex point of the semi-circular configuration 17. Such a contact surface provides the minimum contact area and thus a minimum friction surface.

Another configuration of the surface contact point is best shown in FIG. 4. The contact surface is an annular lip portion 15 comprising an arcuate configuration 19. During use, a rod, shaft or the like is inserted into the center of the cylindrical configuration 3 and rotates against the arcuate configuration 19. A minimal amount of friction surface is again assured by the resulting surface contact being only a single cross-sectional apex point.

The third configuration of the surface contact point is best shown in FIG. 6. This contact surface is an annular lip portion 15 comprising a flat configuration 21 normal to the axial line of the cylindrical configuration 3. Although the flat configuration 21 may slip under excessive rotational force, it is primarily intended to be used in a static position.

The spring bearing 1 further includes a spring retaining cap 23. As best shown in FIG. 6, the cap 23 is placed over the convex bulge 5 of the cylindrical configuration 3 of FIG. 4. A hole 25 is located within the center of the retaining cap 23 thereby allowing a shaft or the like to be inserted therein. The walls 27 of the retaining cap 23 are disposed contiguous to the convex bulge 5. to regulate the outward flexibility of the convex bulge 5. The walls 27 also facilitate the centralization of the spring retaining cap 23 around the cylindrical configuration 3 contained therein. The edge portion 29 of the spring retaining cap 23 may be rounded to a specific radius.

The flexible spring bearing 1 further includes main bearing race 31. A thrust race 33 is configured and dimensioned to be disposed contiguous via a bearing means to the main bearing race 31. The bearing means provides an almost frictionless surface for the main bearing race 31 to rotate upon the thrust race 33. A hole 32 is provided within the main bearing race 31. It is disposed concentric to the cylindrical configuration 3 and to another hole 34 within the thrust race 33. The two holes 32 and 34 are dimensioned to receive a shaft or the like when contained within the cylindrical configuration 3.

FIG. 6 shows the first embodiment of the main bearing race 31. In particular, it is configured to be used in conjunction with the spring bearing 1 of FIG. 4. The annular flat configuration 21 of the end portion of the cylindrical configuration 3 is seated concentrically within a circular recess 35. As pressure is applied in an axial direction to the cylindrical configuration 3, the annular flat configuration 21 flexes outwardly. The walls 36 of the circular recess 35 regulates such flexibility and thus prevents the annular flat configuration 21 from reaching a fatigue diameter.

The bearing means is an annular semi-circular protrusion 37 which is shown as an integral portion of the main bearing race 31 and is disposed contiguous to the thrust race 33. During use, a cross-sectional apex point 39 of the semi-circular protrusion 37 is the primary point of friction contact with the thrust race 33. Accordingly there is a minimal amount of contact surface and thus the friction surface is also minimized.

The main bearing race 31 further comprises an inner annular skirt 41 and outer annular skirt 43 disposed about the semi-circular protrusion 37 located therebetween. Both skirts 41 and 43 have a substantially rectangular cross-section and are shown as an integral portion of the main bearing race 31.

The thrust race 33 includes a raceway formed by an outer annular wall 45 and an inner annular wall 47 which are disposed adjacent the outer annular skirt 43 and the inner annular skirt 41, respectively. This creates a tight seal thereby forming a hermetically sealed channel 49 located therebetween.

The channel 49 may be prepacked with a semi-solid lubricant. Such would reduce the friction between the semi-circular protrusion 37 and its contact point with the thrust race 33. As axial pressure is applied to the cylindrical configuration 3, the semi-solid lubricant will become pressurized and thus force the skirts 41 and 43 against the walls 47 and 45, respectively. Furthermore, the pressurized lubricant would create a hydraulic floating relationship between the main bearing race 31 and the thrust race 33 thereby assuring that the channel 49 will remain hermetically sealed under excessively applied pressures or temperature differentials. Hence the friction created therebetween will be minimized.

Other embodiments of the semi-circular protrusion 37 may be incorporated into the main bearing race 31 to provide a bearing means for the main bearing race 31 to rotate upon the thrust race 33. For instance, as best shown in FIG. 7, a plurality of semi-circular protrusions 37 are integrally formed on the main bearing race 31. The protrusions 37 are disposed concentric with respect to each other and the cylindrical configuration 3. A cross-sectional apex point 39 of each semi-circular protrusion 37 contact the thrust race 33. Alternatively, at least one semi-circular protrusion 37 could be integrally formed on the thrust race as shown in FIG. 8. Hence the main bearing race 31 would rotate upon the thrust race 33 via a cross-sectional apex point 39 of the semi-circular protrusion 37 integral with the thrust race 33.

The main bearing race 31 may be an integral portion of the cylindrical configuration 3. As shown in FIG. 9, such could be substituted for the spring retaining cap 23 of FIG. 6 and thus disposed at the end portion of the convex bulge of the cylindrical configuration 3.

FIG. 10 is a variation of the invention heretofore described showing a magnified section of a bearing 1A. Similar parts for the following embodiments are shown with similar reference numerals followed by a letter to distinguish the various embodiments. In this embodiment, the bearing 1A comprises a main bearing race 31A cooperating with a thrust race 33A. The main bearing race 31A includes a circular recess 35A terminating in a wall 36A for receiving the partially cylindrical configuration (not shown). A plurality of annular protrusions, one shown as 37A, each terminates in an apex point 39A for cooperation with the thrust race 33A. The main bearing race 31A comprises an inner main bearing annular skirt 41A and an outer main bearing annular skirt 43A which cooperate with an inner annular wall 47A and an outer wall 45A of the thrust race 33A. An intermediate annular skirt 48 extends from the thrust race 33A between the inner and outer annular skirts 41A and 43A of the main bearing race 31A. The incorporation of two annular skirts from the main bearing race 31A and two annular walls 45A and 47A with an additional intermediate annular skirt 48A provides a superior seal to the bearing 1A. A visual indicator 51A is established between the lower corner 53A and the upper corner 55A. The space 51A, if reduced to bring the surfaces into substantial contact, will indicate excessive wear and need for replacement.

FIG. 11 shows still another variation of the invention illustrated heretofore. In this embodiment, the bearing 1B comprises a main bearing race 31B having a circular recess 35B terminating in a wall 36B. An inner annular skirt 41B and an outer annular skirt 43B receive an intermediate annular skirt 48B therebetween. The inner annular skirt 41B seals with an inner annular wall 47B. The intermediate member 48B comprises an enlarged head having radially extending tabs 50B in a cavity 52B to lock the main bearing race 31B to the thrust race 33B. A lower corner 53B and an upper corner 55B define an indicator means 51B as heretofore described. This embodiment offers the additional advantage of an interlocking relationship between the tabs 50B of the enlarged head and shoulder on the inner and outer annular skirts 41B and 43B.

FIG. 12 is still a further variation of the invention comprising a bearing 1C having the characteristics set forth in FIGS. 10 and 11. The main bearing race 31C includes the circular recess 35C and 36C with annular protrusions 37C terminating in apex points 39C. An inner and outer main bearing annular skirt 41C and 43C cooperate with an outer annular thrust race skirt 45C. An inner annular wall 47C forms a seal with inner annular skirt 41C. An intermediate annular skirt 48C has an enlarged head and a radial tab 50C for cooperation with a radial tab 42C of inner annular skirt 41C. The main bearing race 31C is interlocked with the thrust race 33C in addition to providing superior sealing therebetween. This embodiment also has a visual indicator 51C as heretofore described.

FIG. 13 shows still a further embodiment of the invention illustrating an improved bearing 1D comprising a main bearing race 31D having a circular recess 35D and a terminal wall 36D. A plurality of annular protrusions 37D terminate in apex points 39D to provide low friction relative to a thrust race 33D. The inner and outer annular main bearing skirts 41D and 43D engage with inner and outer annular thrust race skirt walls 45D and 47D with an intermediate skirt 48D received within cavity 52D of the bearing race 31D. An enlarged head having a radial tab 42D of the outer annular skirt 43D cooperates with the tab 50D of intermediate skirt 48D to interlock the main bearing race 31D and the thrust race 33D. A plurality of balls 56D are interposed between the main bearing race 31D and the thrust race 33D and located between the annular protrusions 37D as shown. The inclusion of balls 56D further reduce the friction of this bearing 1D.

FIG. 14 illustrates still another embodiment of the invention utilizing a bearing 1E wherein the inner and outer main bearing annular skirts 41E and 43E receive an intermediate skirt 48E therebetween. An inner annular skirt 47E forms a seal with inner skirt 41E. An enlarged head, including tab 50E is received within cavity 52E of main bearing race 31E for interlocking with tab 42E of skirt 41E. A ball 56E is interposed between projections 37E to reduce friction between the main bearing race 31E and the thrust race 33E.

FIG. 15 is still a further embodiment of the invention wherein the bearing 1F includes the main bearing race 31F and a thrust race 33F with an intermediate member 60F interposed therebetween. The intermediate member 60F comprises annular projections 37F disposed on opposite sides of the intermediate member 60F. The main bearing race 31F comprises an inner annular skirt 41F and an outer annular skirt 43F with the outer annular skirt having an enlarged head with radial tabs 42F. The thrust race 33F comprises an outer annular skirt 45F having a tab 44F and an inner annular skirt 47F with an intermediate skirt 48F disposed therebetween. Tabs 42F of the outer skirt 43F interlock with tabs 50F and 44F of the intermediate skirt 48F and the outer skirt 45F respectively. This embodiment gives a superior seal for lubricant compacted within the channels 49F in addition to interlocking the thrust race 33F to the main bearing 31F.

FIG. 16 shows still a further embodiment 1G of the invention comprising a main bearing race 31G and a thrust race 33G. The thrust race 33G comprises an inner annular skirt 41G and an outer annular skirt 43G each having tabs 42G and 54G, respectively. The main bearing race 31G comprises an outer annular skirt 45G and an inner annular skirt 47G with an intermediate skirt 48G having an enlarged head with radial tabs 50G. The radial tabs 50G of the intermediate skirt 48G are received within a cavity 52G for providing a superior seal and locking engagement between the main bearing race 31G and the thrust race 33G.

FIG. 17 is still a further embodiment of the invention illustrating a bearing 1H having a main bearing race 31H and a thrust race 33H. An intermediate member 60H is interposed between the main bearing 31H and the thrust bearing 33H with a plurality of balls 56H disposed between annular protrusions 37H disposed on opposed sides of the intermediate member 60H. The thrust race 33H comprises an inner annular skirt 41H and an outer annular skirt 43H having an enlarged head including tab 42H. The main bearing race 31H comprises an intermediate skirt 48H having radial tab 54H cooperating with the radial tab 42H for interlocking the main bearing race 31H and the thrust race 33H. A retaining wall 64H is disposed adjacent the main bearing race 31H with a seal 66 maintaining a lubricant 68H therein. A ball 69H further reduces friction between the intermediate member 60H and skirt 48H.

FIG. 18 illustrates an improved bearing 70 having a cylindrical configuration comprising a first and a second member 71 and 72 with an aperture 73 therein for receiving a shaft 74. A plurality of O-rings 76 seal the shaft relative to the aperture 73. The first member 71 and the second member 72 are secured relative to one another by threaded fasteners 78. A plurality of ribs 80 support a bearing surface 82 relative to base 84 which may be secured to a supporting surface by suitable fasteners extending through apertures 86. In a similar manner, the upper portion of the first member 70 is supported by a plurality of ribs 88 relative to a bearing surface 90. An internal bearing 92 shown in the substantial shape of a +, is disposed within an internal bearing cavity 94 and is locked to shaft 74 by a key 96. The bearing 92 has a plurality of annular projections 97 extending both parallel to and perpendicularly to shaft 74 enabling cooperation with bearing surfaces 82 and 90 and thrust surfaces 98 and 100. Projections 102 further reduce friction between the terminal end of the shaft 74 and the base 84 of the bearing 70. In this embodiment, the terminal end of sahft 74 is secured by a bearing and thrust race within an enclosed internal cavity with a seal being provided by O-rings 76. It should be appreciated that this embodiment may be modified from the + shape to other suitable shapes. It also should be appreciated that the use of internal balls as in FIGS. 13, 14 and 17 may similarly be incorporated into this embodiment.

Figure 19:
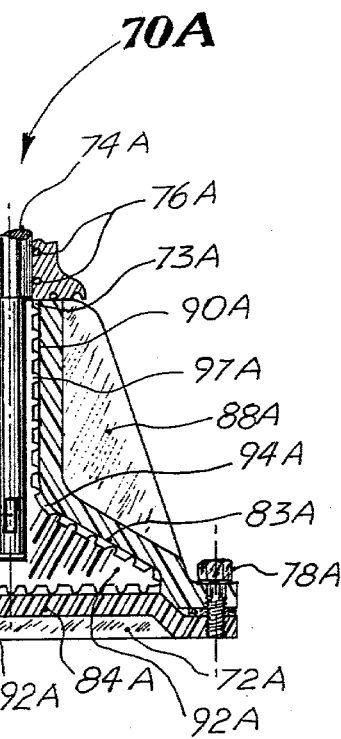
FIG. 19 is a side sectional view of still another variation of the invention shown in FIG. 18.

FIG. 19 illustrates a modification of the bearing shown in FIG. 18 with the bearing 70A comprising a first member 71A and a second member 72A. The first member 71A comprises an aperture 73A for receiving a shaft 74A therein. A plurality of O-rings 76A are disposed on a cap 77A for sealing the shaft 74A relative to the apertures 73A. Plural fasteners 78A secure the first and second members 71A and 72A to one another creating a bearing surface 82A, 83A and 90A Plural ribs 88A add mechanical support to the upper portion of the first member 71A. The shaft is secured by a key 96A to a bearing 92A disposed in bearing cavity 94A. The bearing 92A comprises a plurality of protrusions 97A as set forth hereinabove for reducing friction between the bearing means 92A and the bearing surfaces 82A, 92A and 90A.

Figure 20:
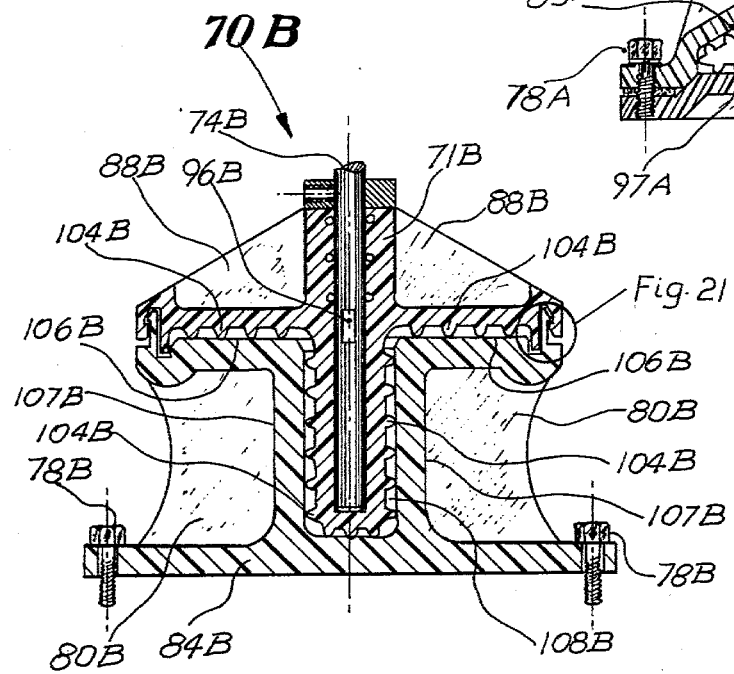
FIG. 20 is a side sectional view of still a third variation of the invention shown in FIG. 18.
Figure 21:
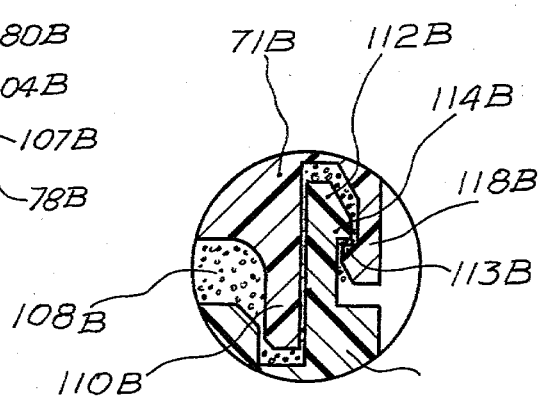
FIG. 21 is an enlarged view of the hermetical seal of the bearing shown in FIG. 20.

FIGS. 20 and 21 show still another embodiment of the invention comprising a bearing 70B having a first member 71B and a second member 72B with a shaft 74B disposed in fixed relationship to the first member 71B by a key 96B. A plurality of ribs 88B support the first member 71B whereas a plurality of ribs 80B support the second member 72B relative to a base 84B. Mechanical fasteners 78B secure the base to a support. In this embodiment, the first member 71B comprises a plurality of projections 104B for cooperation with bearing surfaces 106B, 107B and for containing a lubricant 108B therein. The seals of FIGS. 20 are more particularly shown in FIG. 21 comprising an inner annular skirt 110B and an outer annular skirt 111B with an intermediate skirt 112B disposed therebetween. The outer annular skirt 111B comprises a tab 113B with the intermediate skirt 112B comprising a tab 114B for cooperation with the tab 113B for interlocking the first and second members 71B and 72B together.

The foregoing has disclosed various embodiments of my improved bearing which has superior seals to my prior invention. Although various features have been shown in each of the several embodiments of the invention, it should be understood that the specific aspects of a single embodiment may be incorporated within other embodiments as should be well known by those skilled in the art.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without deparing from the spirit and scope of the invention.

Now that the invention has been described:

The invention claimed is:

1. An improved bearing, comprising in combination:
    a substantially cylindrical configuration having an aperture therein;
    a main bearing race disposed at an end portion of said cylindrical configuration;
    a thrust race disposed adjacent to said main bearing race;
    bearing means interposed between said main bearing race and said thrust race enabling rotation therebetween;
    said bearing means comprising a plurality of protrusions established concentric with said cylindrical configuration;
    each of said plurality of protrusions being at least partially annular about said cylindrical configuration;
    main bearing skirt means extending annularly from said main bearing race and concentric with said cylindrical configuration; and
    thrust race skirt means extending annularly from said thrust race for cooperation with said main bearing skirt means for forming a rotatable seal therebetween.

2. An improved bearing as set forth in claim 1, wherein said plurality of protrusions integrally extend from one of said main bearing race and said thrust race.

3. An improved bearing as set forth in claim 1, wherein said plurality of protrusions extend from an intermediate member disposed between said main bearing race and said thrust race.

4. An improved bearing as set forth in claim 3, wherein said plurality of protrusions extend from plural sides of said intermediate member.

5. An improved bearing as set forth in claim 2 or 3 including a plurality of ball bearings disposed between said plurality of protrusions for reducing friction.

6. An improved bearing as set forth in claim 3, wherein said plurality of protrusions extend from opposite sides of said intermediate member.

7. An improved bearing as set forth in claim 2 wherein said plurality of protrusions extend from said main bearing race; and
    said main bearing race has a cross-sectional area in the general shape of a +.

8. An improved bearing as set forth in claim 1, wherein one of said main bearing skirt means and said thrust bearing skirt means includes plural skirts for receiving therebetween the other of said main bearing skirt means and said thrust bearing skirt means.

9. An improved bearing as set forth in claim 8, including interlocking means established between said main bearing skirt means and said thrust bearing skirt means to prevent separation of said main bearing race and said thrust race.

10. An improved bearing as set forth in claim 9 wherein said interlocking means includes a tab extending radially relative to one of said main bearing skirt means and said thrust bearing skirt means.

11. An improved bearing as set forth in claim 10, wherein said substantially cylindrical configuration comprises at least one accurate portion extending circumferentially about at least one section of said cylindrical configuration.

12. An improved bearing as set forth in claim 1, wherein said main bearing skirt means and thrust race skirt means creates a channel for receiving a lubricant to create a hydraulic floating relationship between said main bearing race and said thrust race.

13. An improved bearing, comprising in combination:
   a partially cylindrical configuration having an aperture for receiving a shaft therein;
   said configuration having an internal bearing cavity communicating with said aperture;
   a main bearing race disposed in said internal bearing cavity of said configuration;
   a thrust race disposed in said internal cavity adjacent to said main bearing race;
   bearing means disposed in said internal bearing cavity for journalling the shaft relative to said main bearing race and said thrust race;
   said bearing means having a plurality of projections extending angularly relative to said shaft for facilitating rotation of the shaft relative to said partially cylindrical configuration.

14. An improved bearing as set forth in claim 13, wherein said bearing means includes a bearing aperture for receiving the shaft.

15. An improved bearing as set forth in claim 14, including shaft locking means for securing the shaft relative to said bearing means.

16. An improved bearing as set forth in claim 15, wherein said shaft locking means includes a key interlocking said bearing means and the shaft.

17. An improved bearing as set forth in claim 13, wherein said cylindrical configuration includes a first and a second member forming the bearing cavity therebetween; and
   means for securing said first member to said second member.

18. An improved bearing as set forth in claim 17, wherein said main bearing race is integral with said first member and said thrust race is integral with said second member.

19. An improved bearing as set forth in claim 17, wherein said first member comprises at least a portion of each of said main bearing race and said thrust race.

20. An improved bearing as set forth in claim 13, wherein said bearing means has a generally triangular cross-sectional area.

21. An improved bearing as set forth in claim 13, wherein said bearing means has a cross-sectional area in the general shape of a +.

22. An improved bearing as set forth in claim 13, including flexible mounting means for flexibly mounting said cylindrical configuration relative to a support.

23. An improved bearing as set forth in claim 22, wherein said flexible mounting means comprises a plurality of ribs extending radially outwardly from said partially cylindrical configuration for flexibly supporting the shaft.

* * * * *